United States Patent [19]
Hutton et al.

[11] 3,867,325
[45] Feb. 18, 1975

[54] ADDITIVES FOR RESINS

[75] Inventors: Ronald Eric Hutton, Southport; Vincent Oakes, St. Helens; Brian Rodney Iles, Liverpool, all of England

[73] Assignee: Akzo N. V., Arnhem, Netherlands

[22] Filed: Feb. 28, 1973

[21] Appl. No.: 336,830

[30] Foreign Application Priority Data
Mar. 3, 1972 Great Britain.................. 10020/72

[52] U.S. Cl...... 260/23 XA, 260/31.8 R, 260/45.7 P
[51] Int. Cl.......................... C08f 19/14, C08f 21/04
[58] Field of Search............ 260/23 XA, 45.7, 45.8, 260/31.8

[56] References Cited
UNITED STATES PATENTS

| | | | |
|---|---|---|---|
| 2,867,594 | 1/1959 | Hansen | 260/23 XA |
| 2,997,454 | 8/1961 | Leistner | 260/23 XA |
| 3,205,189 | 9/1965 | Reed | 260/45.95 R |
| 3,352,817 | 11/1967 | Meyer | 260/94.9 GA |

OTHER PUBLICATIONS

"Polyvinyl Chloride," Sarvetnick, 1969, copy in group 140, pp. 108, 109 & 113 relied on.

*Primary Examiner*—Melvyn I. Marquis
*Assistant Examiner*—William E. Parker
*Attorney, Agent, or Firm*—Clelle W. Upchurch

[57] ABSTRACT

A P.V.C. formulation containing calcium carbonate filler, the average particle size of which is not more than 250 m$\mu$ and a stabilizer composition comprising a mixture of a zinc soap of a carboxylic acid, sulfonic acid or a phenol and at least one soap selected from sodium, calcium, magnesium, barium, aluminum and lead soaps of a carboxylic acid, sulfonic acid or a phenol.

7 Claims, No Drawings

ADDITIVES FOR RESINS

The present invention relates to polymers and, in particular, to stabilizers for polymers and copolymers of vinyl chloride, hereinafter termed P.V.C. resins.

Substantially most opaque, both rigid and flexible resins contain mineral fillers in order to achieve certain effects or advantages in the finished article (see "Fillers for Plastics" by W. C. Wake published in 1971 by Iliffe), e.g., either to lower the cost, improve properties generally or both.

The major tonnage of mineral fillers used are of the calcium carbonate type and these may be broken down into two groups: a first group comprised of ground natural chalks or limestones which have particles sizes ranging from 1 to 4 $\mu$ and a second group known as "precipitated calcium carbonate" which is made chemically, for example, by passing carbon dioxide through calcium hydroxide or by precipitation of calcium carbonate from calcium chloride solution by the addition of sodium carbonate solution or ammonium carbonate solution thereto. The particle sizes of the latter are generally much smaller than those of natural ground chalk and there are several ultra fine grades of precipitated calcium carbonate in general use with particle sizes averaging about 0.075 $\mu$ (75 m$\mu$).

Fillers also are used which have been treated to prevent agglomeration of the particles, enable the filler to be "wetted" and render it more hydrophobic to reduce moisture pickup. This treatment involves coating the particles of calcium carbonate with a film of stearic acid and this is thought to result in each particle being provided with a thin film of calcium stearate; the amount of stearic acid used generally being of the order of 2 to 3 percent by weight of material being treated.

The precipitated calcium carbonate fillers are generally more expensive than the ground natural chalks or limestones but they give in the finished article improved physical properties compared to those achieved using the larger particle size filler materials. For example, in plasticized P.V.C., the use of the smaller particle size filler gives a smoother finish and higher gloss to extruded articles. The improvement in other physical effects generally is also apparent, for example, floor tiles produced using the higher particle size carbonate filler material tend to white scratch when subjected to an abrasive — a disadvantage the lower particle size carbonate filler material does not have. In rigid P.V.C., other improvements in physical properties obtained includes improved impact strength together with a better surface finish and high gloss.

The types of stabilizers generally used with filled vinyl chloride polymers or copolymers are of the conventional type such as metal soaps or lead soaps and such stabilizers exhibit the same heat stability performance whether used with the precipitated filler materials or the natural higher particle size filler materials. The metal soap type of stabilizers are generally combinations of barium, cadmium and zinc and such systems may also be applied without modification to clear formulations containing no fillers. However, cadmium containing stabilizers have several disadvantages including the following:

1. Cadmium soaps are relatively expensive,
2. Cadmium itself is an extremely toxic element, and
3. Cadmium-containing stabilizers are prone to sulfur staining, i.e., such polymers or copolymers of vinyl chloride are prone to staining and darkening in an industrial atmosphere which contain sulfur.

According to the present invention there is provided a P.V.C. formulation having a content of a precipitated calcium carbonate filler, the average particle size of which is not more than 250 m$\mu$ and a stabilizer composition comprising a mixture of a zinc soap of a carboxylic acid, sulfonic acid or a phenol and one or more soaps selected from sodium, calcium, magnesium, barium, aluminum and lead soaps of a carboxylic acid, sulfonic acid or a phenol.

It is preferred that the stabilizer composition comprises at least 1.5 percent and especially from 1.5 to 10 percent and more, particularly from 1.5 to 6 percent by weight based upon the total of the stabilizer of zinc.

The stabilizer composition used need not, and preferably does not, include a cadmium content.

The formulation may also include organic phosphites such as mixed alkyl-aryl phosphites, e.g., a dialkyl aryl phosphite or a diaryl alkyl phosphite, and phenolic anti-oxidants such as are used in conventional barium/cadmium/zinc stabilizers.

The filler may, if desired, be treated with stearic acid in the manner described above.

In a further aspect the present invention provides a process for the production of a P.V.C. article wherein a formulation of the present invention as defined above is formed into said article by known methods, said process preferably being of the type which utilizes heat in the processing of the formulation to form the article, such as calendaring or extruding.

In yet, a further aspect, the present invention provides a stabilizer composition for use in a P.V.C. resin formulation, said stabilizer composition comprising a zinc soap of a carboxylic acid, sulfonic acid or a phenol and one or more soaps selected from sodium, calcium, magnesium, barium, aluminum and lead soaps of a carboxylic acid, sulfonic acid or phenol, the zinc content being at least 1.5 percent and preferably from 1.5 to 10 and especially from 1.5 to 6 by weight of the stabilizer composition may be used with or without a filler.

The stabilizer compositions may also have a content of an organic phosphite such as the aforementioned mixed alkyl aryl phosphites and also phenolic antioxidants such as those used in conventional barium/cadmium/zinc stabilizers.

In yet a further aspect the present invention provides a process for the production of a P.V.C. article from an unfilled P.V.C. formulation or a P.V.C. formulation containing a filler other than a precipitated calcium carbonate filler having an average particle size of not more than 250 m$\mu$, For example, fillers which may be used are basic in nature and include magnesium carbonate and alumina.

It is possible by using the combination of the soap stabilizer composition of the invention with the low particle size filler to obtain very superior heat stability in the formulations and finished products than that obtained when the carbonate filler is a ground natural calcium carbonate.

Also, where toxicity and/or sulfur staining is a problem, the present invention removed the need to use cadmium containing soaps in the stabilizer compositions and thereby removes the disadvantages attendant on such soaps and referred to above.

The present invention will be further described by way of example with reference to the following specific examples.

Example 1a

The formulation:
| | |
|---|---|
| P.V.C. | 100 parts |
| Dialkyl phthalate | 47 parts |
| Epoxidized soya bean oil | 3 parts |

Metal soap stabilizer composition of the present invention comprising:

| | | |
|---|---|---|
| Barium salt of Versatic 911 acid | 37% weight | ) |
| (a mixture of fully saturated and highly branched $C_9$ and $C_{11}$ carboxylic acids) | | ) ) ) ) 2 ) parts |
| Zinc salt of 2-ethyl hexoic acid | 23% weight | ) ) |
| Di-phenyl isodecyl phosphite | 14% weight | ) ) |
| Hydrocarbon solvent | 26% weight | ) |
| Precipitated calcium carbonate filler - Winnofil S or Calofort S | 30 parts | | was mixed together on a two-roll laboratory mill at 160°C. for 5 minutes until thoroughly homogeneous. (The names Winnofil, Calofort and Versatic are all trade names). The resulting sheet was then taken from the roll at a thickness of 0.05 inches and samples obtained therefrom heated in an air circulation oven at 185°C. and withdrawn at 10 minute intervals. These samples were examined visually for rate of color development, the condition being taken as representative of the rate of decomposition of the P.V.C. compound. The results of the evaluation in terms of time for the samples to develop specific colors are given in Table 1 below. This example contrasts which the superior heat stability obtainable due to a synergistic effect when a stabilizer composition of the present invention is used in conjunction with a precipitated calcium carbonate of lower average particle size, in this case 75 m$\mu$, with the relatively poor heat stability when the low particle size precipitated calcium carbonate is replaced by a ground natural calcium carbonate of particle size greater than 1,000 m$\mu$.

Table 1

| Time Min. at 185°C. | Color of filled P.V.C. during oven test | |
|---|---|---|
| | Precipitated CaCO$_3$ | Ground, natural CaCO$_3$ filler |
| 0 | White | Grey |
| 10 | do. | do. |
| 20 | do. | do. |
| 30 | do. | do. |
| 40 | do | Black |
| 50 | Pale Yellow | |
| 60 | Yellow | |
| 70 | Amber | |
| 80 | Black | |

Example 1b

Using the formulation:
| | |
|---|---|
| P.V.C. | 100 parts |
| Dialkyl phthalate | 47 parts |
| Epoxidized soya bean oil | 3 parts |
| Precipitated calcium carbonate | 30 parts |
| Stabilizer | 2 parts |

The stabilizer composition of the present invention given in Example 1, denoted "Stabilizer 1" was compared with a conventional liquid barium/cadmium/zinc stabilizer, denoted "Stabilizer 2" which comprised:

| | |
|---|---|
| Zinc octoate | 2.7% |
| Cadmium octoate | 11.3% |
| Barium octoate | 21.0% |
| Di-phenyl isodecyl phosphite | 30.0% |
| Hydrocarbon solvent | 35.0% |

It can be seen that the P.V.C. product made using the high zinc content Stabilizer 1, zinc content approximately 4 percent by weight, has better heat stability properties than that produced using the conventional liquid barium/cadmium/zinc stabilizer, Stabilizer 2 having a zinc content of only 0.5 percent.

Table 2

| Time Min. at 185°C. | Color of filled P.V.C. during oven test | |
|---|---|---|
| | Stabilizer "1" | Stabilizer "2" |
| 0 | White | White |
| 10 | do. | do. |
| 20 | do. | do. |
| 30 | do. | Grey |
| 40 | do. | Yellow |
| 50 | Pale Yellow | Yellow |
| 60 | Yellow | Amber |
| 70 | Amber | Black |
| 80 | Black | |

EXAMPLE 2a

A P.V.C. formulation was prepared in the manner described in Example 1 the only variation being that the stabilizer, designated Stabilizer "3" contained 5.6 percent calcium and 8.6 percent zinc and had the following composition:

| | |
|---|---|
| Calcium hexoate | 45% |
| Zinc decanoate | 50% |
| Diphenylol propanpe | 5% |

EXAMPLE 2b

The performance of stabilizer "3" of the present invention was compared with the conventional liquid barium/cadmium/zinc Stabilizer 2 given in Example 1b and the results are contained in Table 3.

Table 3

| Time Min. at 185°C. | Color of Filled P.V.C. During Oven Test | |
|---|---|---|
| | Stabilizer 3 | Stabilizer 2 |
| 0 | White | White |
| 10 | White | White |
| 20 | White | White |
| 30 | White | Grey |
| 40 | White | Pale Yellow |
| 50 | White | Yellow |
| 60 | Pale Yellow | Amber |
| 70 | Yellow | Black |
| 80 | Amber | |
| 90 | Black | |

Again, it can be seen that Stabilizer 3 of the present invention having a high zinc content imparts better heat stability properties to a P.V.C. product than the conventional low zinccontent Stabilizer 2.

EXAMPLE 3

A further stabilizer composition according to the present invention which has a zinc content of 4.5 percent has the following composition:

| | |
|---|---|
| Barium nonyl phenate | 16.8% |
| Zinc 2-ethylhexoate | 24.5% |
| Diphenyl isodecyl phosphite | 33.0% |
| Tertiary butyl phenol | 6.0% |
| Hydrocarbon solvent | 19.7% |

This stabilizer composition when tested in the manner described in Example 1 had a similar performance to Stabilizer 1 given in Example 1.

The P.V.C. formulation according to the invention contains per 100 parts by weight of P.V.C. 0 to 100 parts by weight of calciumcarbonate filler or an other filler having an average particle size of not more than 250 m$\mu$ and 0 to 5 parts of a stabilizer composition. The stabilizer composition comprises 5 to 60 percent by weight of an organic phosphite, 0.1 to 10 percent by weight of a phenolic antioxidant, and 1.5 to 10 percent by weight of zinc, present as a zinc soap. The remainder being sodium, calcium, magnesium, barium, aluminium and lead soaps of a carboxylic acid, a sulphonic acid or a phenol.

What is claimed is:

1. A polyvinyl chloride formulation containing precipitated calcium carbonate filler, the average particle size of which is not more than 250 m$\mu$ and a stabilizer composition consisting essentially of a mixture of a zinc soap of a monocarboxylic acid having from 8 to 10 carbon atoms, sulfonic acid of a phenol and
at least one soap selected from sodium, calcium, magnesium, barium, aluminum and lead soaps of a monocarboxylic acid having from 6 to 11 carbon atoms, sulfonic acid or a phenol, said stabilizer composition comprising at least 1.5 percent by weight of zinc, based upon the total weight of said stabilizer composition.

2. The polyvinyl chloride formulation as claimed in claim 1 which contains an organic phosphite.

3. The polyvinyl chloride formulation as claimed in claim 2 in which said phosphite is a mixed alkyl-aryl phosphite.

4. The polyvinyl chloride formulation as claimed in claim 1 which contains a conventional phenolic antioxidant.

5. The polyvinyl chloride formulation as claimed in claim 1 in which the calcium carbonate filler has been treated with stearic acid.

6. The polyvinyl chloride formulation as claimed in claim 1 in which the stabilizer composition comprises from 1.5 percent to 6 percent by weight based on the total weight of the stabilizer composition of zinc.

7. The polyvinyl chloride formulation as claimed in claim 1 which comprises from 1.5 to 10 percent by weight of zinc based on the total weight of the stabilizer composition.

* * * * *